United States Patent [19]

Tax et al.

[11] 4,257,618
[45] Mar. 24, 1981

[54] TERRAIN-ADAPTABLE SUPPORT STRUCTURE

[75] Inventors: Hans Tax, Potsdamer Strasse 3, D-8000 Munich, Fed. Rep. of Germany; Klaus Hösler, Eichenau; Dieter Bauer, Munich, both of Fed. Rep. of Germany

[73] Assignee: Hans Tax, Munich, Fed. Rep. of Germany

[21] Appl. No.: 60,591

[22] Filed: Jul. 25, 1979

[30] Foreign Application Priority Data

Aug. 4, 1978 [DE] Fed. Rep. of Germany ....... 2834301
Nov. 30, 1978 [DE] Fed. Rep. of Germany ....... 2851859

[51] Int. Cl.³ .............................................. B62D 49/08
[52] U.S. Cl. .................................... 280/6.11; 180/41; 212/189; 248/188.3; 280/6 H; 280/DIG. 1
[58] Field of Search ............. 280/6 R, 6 H, 6.1, 6.11, 280/704, 755, DIG. 1; 180/41; 212/145; 248/188.3

[56] References Cited

U.S. PATENT DOCUMENTS

| 3,185,423 | 5/1965 | Jones | 248/188.3 |
| 3,191,954 | 6/1965 | Schuetz | 280/6 H |
| 4,015,678 | 4/1977 | Wirth et al. | 248/188.3 |

*Primary Examiner*—John J. Love
*Assistant Examiner*—Ross Weaver
*Attorney, Agent, or Firm*—Toren, McGeady and Stanger

[57] ABSTRACT

A system or structure for supporting a construction rig, such as a crane or the like, is formed with four bearing members each of which is maintained in contact with a ground formation over which the rig is to be moved by deflective action of the support structure. In the operation of the device, when a first bearing member is deflected relative to a reference plane, a second bearing member located diagonally opposite the first bearing member is deflected relative to the reference plane in the same direction by approximately the same distance. At the same time, a third and fourth support bearing member of the support system are each deflected relative to the reference plane in a direction opposite to the direction in which the first and second support bearing members are moved by approximately the same distance as the first two support bearing members.

23 Claims, 11 Drawing Figures

FIG.4
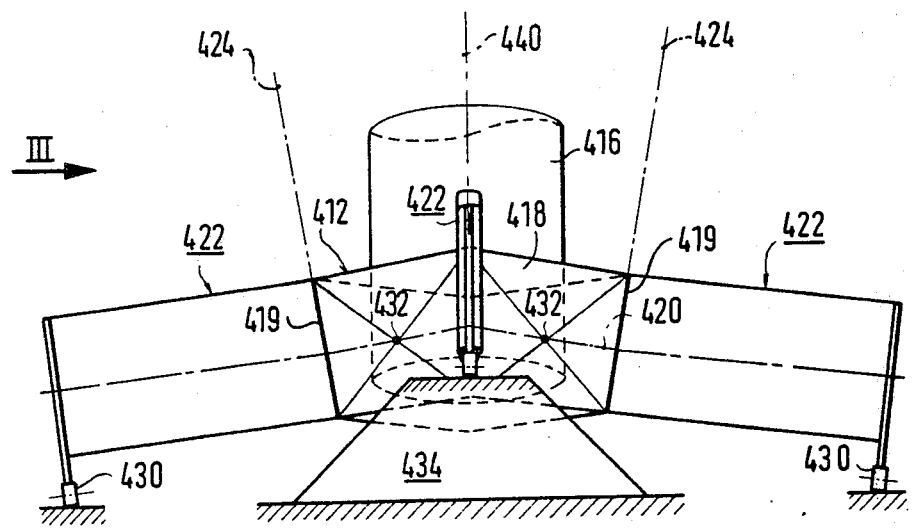
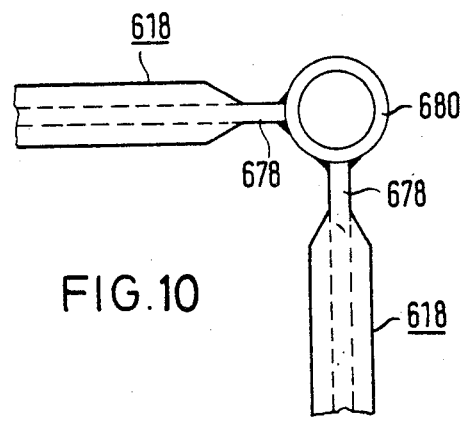
FIG.10

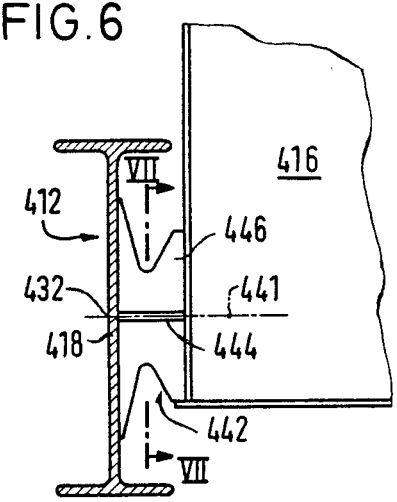
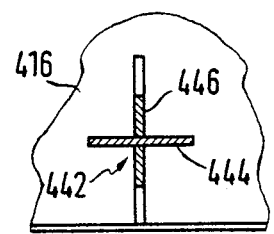
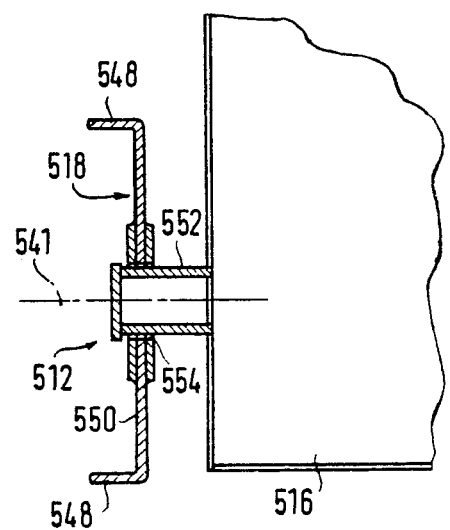

TERRAIN-ADAPTABLE SUPPORT STRUCTURE

BACKGROUND OF THE INVENTION

The invention relates generally to a mobile support structure and more particularly to a support structure for a rig which is capable of adapting to uneven terrain. Support structures of the type to which the present invention relates usually include four support bearing members which bear upon the terrain and which are arranged at least approximately in the corners of a rectangle, with the bearing members being located in a common reference plane when the terrain is flat.

Support structures of this type are used, for example, as supporting frames for construction rigs such as rotary cranes, excavators and the like. When used in this connection, there arises the problem of achieving simultaneous contact with the ground with all four support bearing members when the terrain is not even without reducing the stability of the rig and its load capacity. Prior art measures for solving this problem have heretofore been suggested, for example in German Auslegeschrift No. 1,171,594. However, measures of this type have been found to be unsatisfactory.

Other examples of prior art devices may be found in the following German patent publications: DE-AS No. 1,026,498; DE-OS No. 2,548,381; and DE-GM No. 1,821,433.

The invention is directed toward the task of designing a support structure of the type described above which is capable of operation on uneven ground formations and which is as rigid as possible against forces introduced from the supported rig.

SUMMARY OF THE INVENTION

In accordance with the invention there is provided a support structure comprising support bearing members coupled relative to a supported rig so as to be movable essentially in a vertical direction relative to a horizontal reference plane and which are coupled together in such a manner that, when a first support bearing member is deflected relative to the reference plane, a second support bearing member located diagonally opposite the first support bearing member is deflected relative to the reference plane in the same direction and by approximately the same distance, while the third and the fourth support bearing members are deflected relative to the reference plane in the opposite direction from the first and the second support bearing members by approximately the same distance as the two first support bearing members.

According to a first embodiment of the invention, a support structure is provided wherein the coupling between the four support bearing members comprises a four-rod coupling system arranged at the rig. The four coupling rods of the coupling system are arranged to be essentially parallel to the connecting lines of two consecutive support bearing members, they are connected at their ends through universal joints and they are supported at the rig in an articulated manner about swivel axles of the coupling rods. These axles are arranged in the middle of the coupling rod lengths and they extend perpendicular relative to the longitudinal extension of each coupling rod and essentially parallel to the reference plane, with the corners of the four-rod coupling system containing the universal joints being connected to the support bearing members.

The support bearing members may be guided for movement vertically at the rig. The four-rod coupling system may be a component part of the guides of the rig.

A structurally advantageous further development of the first solution provides that the support bearing members are arranged in the vertices of each two-rod guide system wherein the two-rod guide systems of the diagonally oppositely located support bearing members are each located in a vertical diagonal plane assigned to these support bearing members and are formed by guide rods which are connected to each other in an articulated manner through a vertex hinge whose axis is perpendicular relative to the corresponding diagonal plane. One of the guide rods of each two-rod guide system is, at its end facing away from the vertex, connected to the corresponding corner of the four-rod coupling system and the other guide rod is, with its end facing away from the vertex, pivotally supported in a guide rod hinge which is arranged at the rig and which has an axis perpendicular relative to the corresponding diagonal planes. In this case, the guide rod hinge may be located in approximate vertical alignment with the corresponding corner of the four-rod coupling system.

Furthermore, consecutive two-rod guide systems can be connected to each other at least approximately in the vertices by means of support rods which are connected to the two-rod guide systems by means of support rods which have an essentially perpendicular hinge axis relative to the vertical connecting plane of the respective support bearing members.

In a second embodiment of the invention, each support bearing member is vertically adjustable at the rig by means of two cylinder-piston units which are coupled with respect to their movement, wherein the piston-cylinder units of two adjacent support bearing members are connected through a hydraulic compensating line in order to achieve an oppositely oriented adjusting movement.

In a third embodiment, the support structure is formed so that the rig is connected to an essentially horizontal platform which consists of four essentially rectangular warping platform walls which are connected in pairs along vertical edges. These platform walls have a bending resistance in the region of the vertical edges about the axes defined by the vertical edges which resistance is smaller than the bending resistance of the platform walls about axes which are parallel to the edges in the region outside of these vertical edges. By a stiffening in a center region of the height of the platform and/or by the residual stiffness in the region of the edges, a collapsing of the horizontal platform cross section at a medium height of the platform walls is prevented under the horizontal forces which must be expected during operation. However, an inclination of diametrically oppositely located edges toward each other is enabled, and support arms connected to the platform near the edges extend horizontally toward the outside of the platform so as to be bending resistant about horizontal transverse axes and so as to carry a support bearing member at a horizontal distance from the respective edge. In this case, the bending resistance of the platform walls in the region of the vertical edges may be at most one-half, and preferably one-tenth, of the bending resistance in the regions outside of the edges. Static conditions which are especially easily controlled will be obtained if the platform walls are connected to each other in an articulated manner along the vertical edges.

By a further aspect of the invention, the stiffening may act on the intersecting points of the diagonals of the platform walls, for example, in such a manner that the stiffening is connected in the intersecting points of the diagonals of the platform walls to the platform walls so as to be flexible or elastic about axes which are essentially perpendicular to the respective wall plane.

According to a preferred structure of the third solution, the stiffening is provided by a portion of the rig which forms the connection of the rig to the platform.

In the third embodiment, each wall of the platform can be formed by a section girder, for example a U-section girder, whose outer legs are arranged essentially horizontally or by an I-beam section girder whose transverse legs are arranged essentially horizontally.

With respect to a width adjustment of the support structure, it may be desirable to connect the support arms near the vertical edges to the platform so as to be pivotable about an essentially vertical swivel axis. In this case, to avoid moments and stresses resulting therefrom, the swivel axes of the hinges connecting the support arms with the platform and the axes of the hinges connecting the walls with each other may coincide.

The support structure and the rig may be designed to form a portal such as, for example, a crane portal.

Furthermore, the rig may comprise a ball-bearing slewing ring with a vertical axis of rotation.

Additionally, the rig may comprise a power crane.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the Drawings:

FIG. 4 is a side view showing the embodiment of FIG. 3 viewed in the direction of arrow IV of FIG. 3;

FIG. 6 is a vertical sectional view taken through a platform wall in the region of a coupling point between the rig and the platform wall in the third embodiment of the invention;

FIG. 7 is a partial sectional view taken along the line VII—VII of FIG. 6;

FIG. 8 is a sectional view taken through a platform according to FIG. 6 formed in accordance with a modification of the third embodiment;

FIG. 10 is a top view of a platform corner which shows the connection between two platform walls according to another modification of the third embodiment of the invention.

DETAILED DESCRIPTION OF THE PREFERRED EMBODIMENTS

Figure 1:
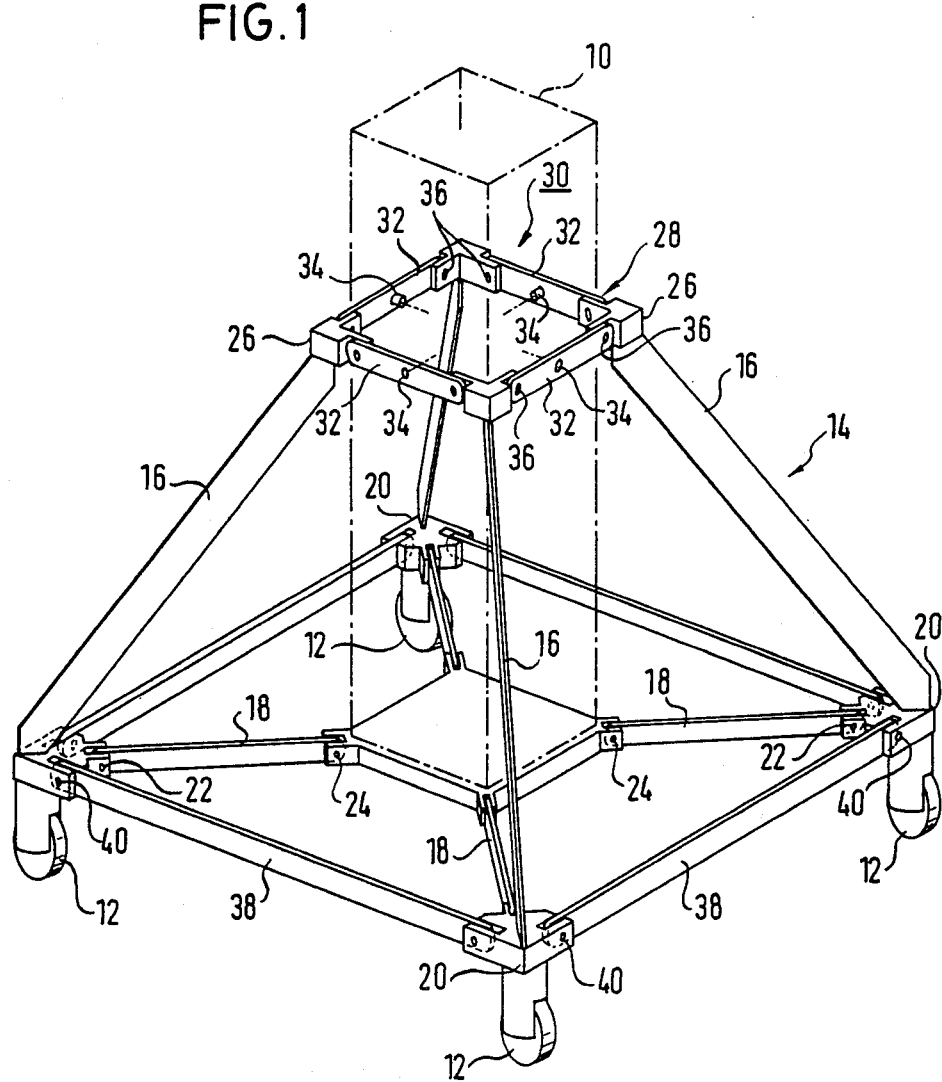
FIG. 1 is a perspective view showing a first embodiment of the invention.

In the first embodiment of the invention depicted in FIG. 1, a section of a crane tower 10 is shown as the rig to be supported. Four support bearing members 12 are provided at the crane tower section 10. Each of these support bearing members 12 is constructed as a wheel set and is guided at the crane tower section 10 by means of a two-rod guide system 14. The two-rod guide system 14 comprises an upper guide rod 16 and a lower guide rod 18 which are connected in an articulated manner at a vertex 20 by means of a vertex hinge 22. The hinge axis of the vertex hinge 22 extends perpendicularly relative to a vertical diagonal plane extending through the two support bearing members 12, which diagonal plane also contains the diagonally oppositely located two-rod guide systems.

The lower guide rod is connected to the crane tower section 10 through a guide rod hinge 24 whose axis also extends perpendicularly relative to the aforementioned diagonal plane. The upper guide rod 16 ends in a hinge block 26 which is connected to a corner 28 of a four-rod coupling system 30. The four-rod coupling system 30 comprises four coupling rods 32 which are each pivotally supported about coupling rod swivel hinges 34 at each side surface of the crane tower section 10. The swivel axes of the coupling rod swivel hinges extend perpendicularly relative to the longitudinal extension of the coupling rods and essentially parallel to the support surface on which the support bearing members 12 are placed. Each hinge block 26 is connected through a coupling hinge 36 to the adjacent coupling rods 32, so that the coupling rods 32 are connected to each other in the manner of universal joints.

Let it be assumed that the four support bearing members 12 are placed on a flat terrain defining a common plane. Let it be further assumed that this plane is designated as the reference plane of the support structure. When the support bearing member 12 located on the righthand side in FIG. 1 is raised above this reference plane of the support stucture, the support bearing member 12 which is on the lefthand side in FIG. 1 is raised relative to this reference plane by the same distance and in the same direction. This can be easily observed when looking at the four-rod coupling system 30.

Correspondingly, the support bearing member 12 seen in the front and the rear of FIG. 1 are lowered relative to the reference plane by the same distance by which the support bearing members 12 on the right and the left had been raised relative to the reference plane. This also results clearly from observing the four-rod coupling system 30.

The reference plane is stationary relative to the rig and extends parallel relative to the plane which is defined by the four coupling rods swivel hinges 34. When it is assumed in FIG. 1 that the four support bearing members 12 are initially on a travel surface which coincides with the reference plane of the support structure, it is possible to raise each of the four support bearing members 12 relative to the travel surface without raising the three other support bearing members from the travel surface. This means that the support structure can travel on any uneven terrain as long as the vertical deflections resulting from the unevenness remain within the possible deflections of the support bearing members 12 relative to the reference plane as determined by the mobility of the four-rod coupling system.

Concerning the construction, the vertices 20 of two consecutive two-rod guide systems 14 are connected to each other through support rods 38 which are connected to the vertices 20 in an articulated manner through support hinges 40. The axes of the support hinges extend perpendicularly relative to the common verticle plane which extends through the two support bearing members assigned to the respective support rod 38.

Figure 2:
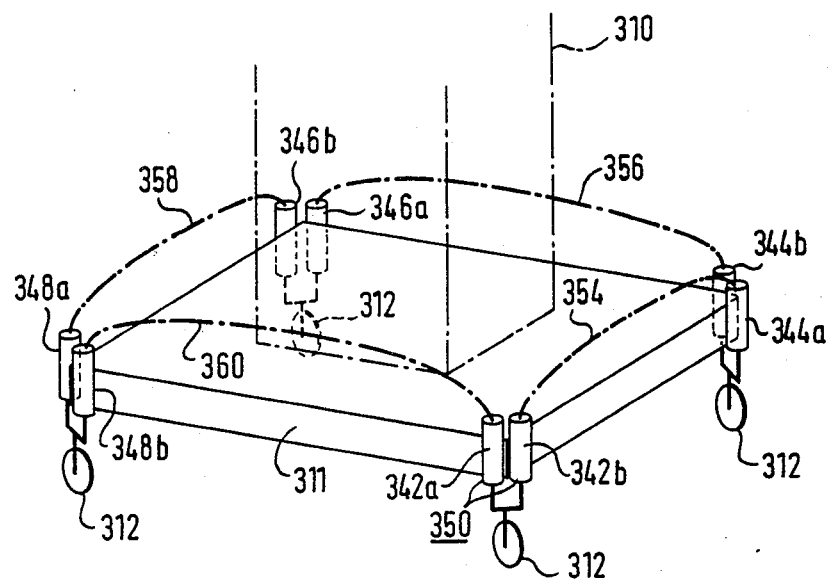
FIG. 2 is a perspective view illustrating a second solution of the invention.
Figure 2A:
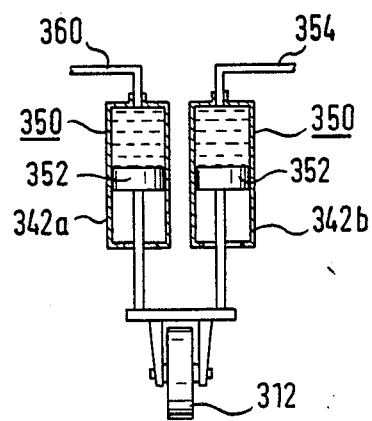
FIG. 2a is a sectional view illustrating an enlarged detail of FIG. 2.

In an alternative embodiment according to FIGS. 2 and 2a, a base plate 311 is shown together with a crane tower section 310 as the rig. Connected to the rig in the four corners of the base plate 311 are pairs of cylinder-piston units 342a, 342b; 344a, 344b; 346a, 346b; 348a, 348b which are coupled with respect to movement. The cylinders 350 of the cylinder-piston units are connected to the base plate 311. The pistons 352 of the individual pairs 342, 342b, etc. are connected to each other and jointly to the support bearing members 312. The piston-cylinder units 342b and 344a are connected to each other through a first hydraulic compensating line 354. Another hydraulic compensating line 356 connects the cylinder piston units 344b and 346a with a third compensating line 358 connecting the cylinder piston units 346b and 348a, while a fourth compensating line 360 connects the cylinder-piston units 348b and 342a.

It is once again to be assumed that the support bearing members 312 are located in a reference plane in an initial position parallel to the base plate 311. This initial position corresponds to the position in which the crane is placed on a completely flat travel surface. When the forwardmost support bearing member 312, as viewed in FIG. 2, is raised relative to the reference plane, hydraulic liquid is shifted through the lines 354, 360 from the cylinders 342b, 342a to the cylinders 344a or 348b. There thus occurs an emptying of the cylinders 344b, 348a, so that hydraulic liquid can flow from the cylinders 346a, 346b through the hydraulic lines 356, 358 into the cylinders 344b or 348a. Accordingly, the nearmost support bearing member, as viewed in FIG. 2, is also raised relative to the reference plane, while the support bearing members 312 on the left and the right sides in FIG. 2 are lowered relative to the reference plane. Thus, in flat terrain, the operation of the support structure according to FIG. 2 is essentially similar to the operation of the support structure according to FIG. 1.

In a third embodiment in accordance with FIGS. 3, 4, 5, 6 and 7, the rig is formed as a round column which may be, for example, the lower portion of a crane column 416. This rig is connected to a platform 412 in a manner which shall be described hereinafter. The platform 412 consists of four platform walls 418 which are constructed so as to be resistant to bending, but which will warp about their longitudinal center lines 420 extending horizontally in the wall plane. The essentially rectangular platform walls 418 are flexibly connected to each other at their vertical edges 419 in such a manner that they are movable relative to each other at least within certain limits in the sense of an enlargement or reduction of the angle which is formed between two platform walls 418. Accordingly, the platform 412 is not a rigid structure in the same sense usually understood from the term "frame".

The platform 412 is connected along platform edges 419 to a support rod 422 in an articulated manner about an essentially vertical swivel axis which coincides with a respective platform edge 419, the support arm 422 resting with its end facing away from the platform on a support bearing member 430 in the form of an undercarriage. Of course, the support arms 422 can also be connected rigidly to the platform 412 at the edges 419. The pivotally arranged support arms 422 can be controlled in any known manner, but this control is considered beyond the scope of the present application.

The rig 416 is connected in an articulated manner through hinges 432 to the platform walls 418, as will be explained in more detail with reference to FIGS. 6 and 7. It should be mentioned however that the hinge axes of the respective hinges 432 extend essentially perpendicularly relative to the respective platform wall 418 through the intersecting point of their diagonals, as indicated in FIG. 3.

Figure 3:
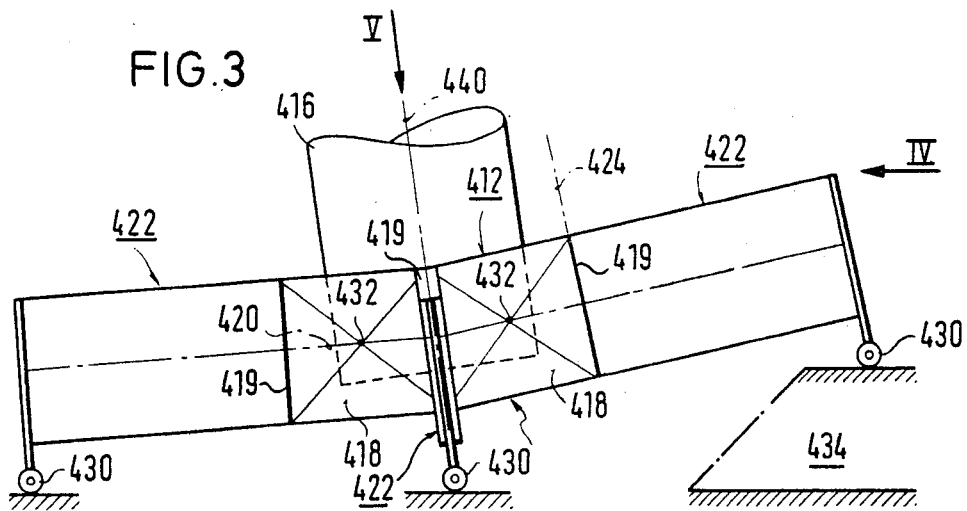
FIG. 3 is a side elevation depicting the operation of a third embodiment of the invention viewed in the direction of arrow III of FIG. 4.

The view in FIG. 3 is in the direction of a platform diagonal. The platform 412 rests on a terrain elevation 434 with the support arm 422 on the right in FIG. 3. If the platform 412 were completely rigid, one of the support arms 422 extending parallel to the direction of view of FIG. 3 would be elevated with its undercarriage 430. As a result, the other support arms would be subjected to a much higher load than when the support surface is flat and the stability of the platform would be significantly reduced, especially when it serves as the wheel frame for a crane.

However, as a result of its inventive construction, the platform 412 is deformed in such a way that all four support arms 422 contact the ground through their support bearing members 430. The distribution of soil pressures under the support bearing members 430 remains almost independent from the degree of unevenness of the ground 434. The type of deformation will now be explained in more detail, especially with reference to FIG. 5.

Figure 5:
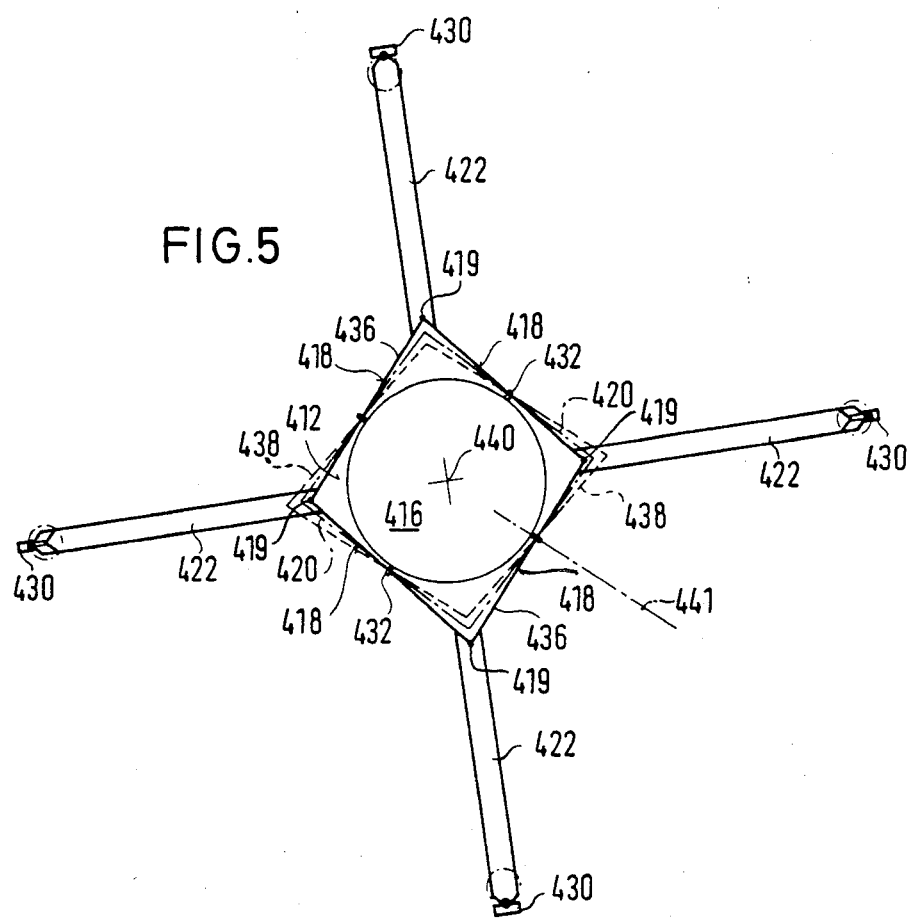
FIG. 5 is a top view of the device of FIGS. 3 and 4 viewed in the direction of arrow V of FIG. 3.

In FIG. 5, the upper edges of the platform walls 418 are illustrated by solid lines 436. Broken lines 438 represent the lower edges of the platform walls 418 and dash-dot lines correspond to the longitudinal center lines 420 of the platform walls 418. As can be seen in FIG. 3, by raising the right support arm 422, the axis 424 of the edge 419 is inclined in such a way that it converges toward the top of the device with the axis 440 of the rig 416. As a result, the square formed by the upper edges 436 in the undeformed state of the platform 412 is deformed to a rhombus whose shorter diagonal extends in the direction of the left and right support arms 442 in FIGS. 3 and 5.

Simultaneously, the square formed in the undeformed state by the lower edges 438 of the platform 412 is also deformed to a rhombus whose shorter diagonal, however, extends in the direction of the upper and the lower support arms 422 in FIG. 5. As a result, the axes 424 at the upper and the lower frame corner as seen in FIG. 5 diverge from each other and from the cylinder axis 440 of the rig 416 toward the top of the device, as shown in FIG. 4. Accordingly, the support arms 422 attached to these frame corners are pressed downwardly with their ends which face away from the platform 412. Thus, these two support arms 422 perform a movement relative to the reference plane of the support structure which is opposite to the movement of the support arms 422 which are resting on the terrain elevation 434, the reference plane being a plane which is defined as extending parallel through the hinges 432 and, in the case of a flat travel surface, as coinciding with this flat travel surface.

As can be seen from FIG. 5, during deformation of the platform 412 which corresponds to a warping of the individual platform walls 418 about their respective longitudinal center lines 420, the respective distance of the platform wall 418 from the rig 416 along the longitudinal center line 420 remains essentially constant. This means that along this contour represented by the longitudinal center line 420 a connection between the rig 416 and the platform walls 418 may take place without significant radial compression or tensile forces acting on the rig 416 during the deformation of the platform 412. Support of the rig 416 on the platform 412 without any constraining forces is achieved in that the bearing points 432 are not only located on the respective longitudinal center line 420, but also at the intersecting point of the diagonals of the platform walls 418 with a hinge axis 441 which extends essentially perpendicular to the platform wall 418. At this intersecting point of the diagonals, the respective platform wall 418 remains essentially stationary in the direction of the axis of the rig 416 during deformation of the platform 412, inasmuch as it performs at this point only a rotation about the hinge axis 441 extending through the point. Accordingly, in the embodiment shown in FIGS. 3 to 5, the rig 416 is supported on the platform 412 without constraining forces. If, for example, the rig 416 carries a ball bearing slewing ring on which the upper portion of a crane is supported, this ring will not be subjected to constraining forces during deformation of the platform 412.

In addition, the platform is not deformable as a result of loads which act from the rig 416 on the platform 412 so that, as in conventional platforms, the stability and the load carrying ability of the platform result from the position of the center of gravity of the entire structure consisting of the platform and the rig.

The deformation of the platform 412 has been described by reference to an example wherein a support arm 422 travels over a terrain elevation. If, on the other hand, the support arm 422 travels through a terrain depression, analogous deformations will of course take place.

The coupling of the rig 416 to the platform 412 will now be explained in more detail with reference to FIGS. 6 to 8. FIG. 6, which is a sectional view taken through the axis 440 of the rig 416 at a bearing point 432, shows a platform wall 418 having the shape of an I-beam section girder. Such a girder is bending resistant, but is much less resistant against warping. The connection between the rig 416 and the platform wall 418 is effected by a connecting element 442 which consists of two crosswise-connected flat sections 444, 446 (see FIG. 7). The connecting element 442 is rigidly connected to the rig 416 and to the respective platform wall 418, for example, by welding. The connecting element 442 is stiff against forces which act horizontally and vertically between the platform wall 418 and the rig 416, so that the platform 412 is stiffened by the lower end of the rig 416 and the connecting elements 442. On the other hand, the connecting element allows, to the degree necessary for the deformation of the platform 412, a rotation of the platform wall 418 relative to the rig 416 and about an axis 441 extending perpendicularly relative to the platform wall 418 through the crossing point of the flat sections 444 and 446.

A modification of FIGS. 6 and 7 is shown in FIG. 8. In this embodiment, the platform wall 518 is formed by a U-section with horizontally extending outer legs 548, wherein a web 550 forming the vertical platform wall 518 is relatively larger in height in relation to the width of the outer leg 548. The rig 516 is supported by means of a tubular or solid pivot pin 552 which is rigidly connected to the rig 516 and is rotatable in a bearing opening 554 in the web 550 of the platform wall 518 about a hinge axis 541 extending perpendicularly relative to the platform wall through the intersecting point of the diagonals of the platform wall 518.

Of course, the pivot pin 552 could also be rigidly connected to the platform wall 518 and be supported rotatably in the rig 516. The platform 512 could be stiffened by the rig 516, for example, by surrounding the pivot pin 552 with a spacer sleeve between the web 550 and the rig 516.

Figure 9:
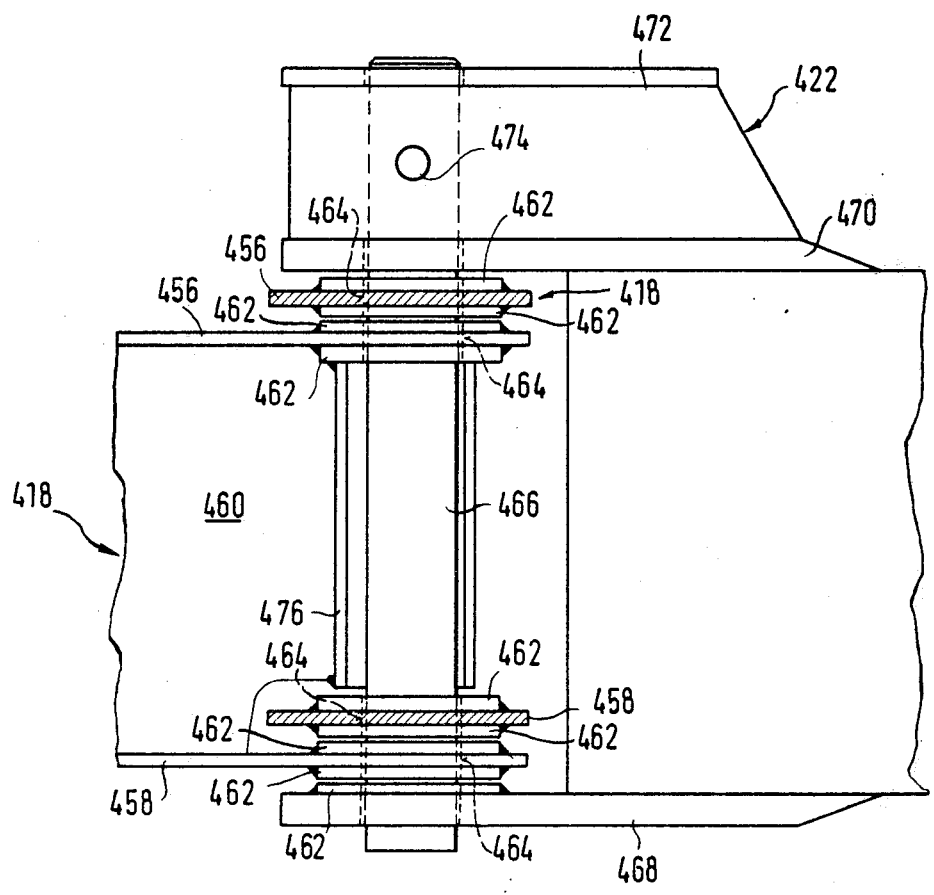
FIG. 9 is a vertical section extending parallel to a platform diagonal in the region of a platform corner, which shows the connection of two platform walls to each other and to a support in the third embodiment of the invention.

FIG. 9, which illustrates the connection of two platform walls to each other and to a support arm, depicts a platform wall 418 which is constructed as an I-beam girder with an upper flange 456 and a lower flange 458. The upper flange 456 and the lower flange 458 are extended beyond the web 460 and they each carry bearing rings 462 which are arranged concentrically relative to bearing bores 464 which are in alignment in the ends of the upper flange 456 and the lower flange 458. The bearing rings 462 are, for example, welded to the upper flange 456 and the lower flange 458. The second platform wall 418 is constructed identically. However, the drawing shows of this platform wall only the ends of the two flanges 456 and 458 and the bearing rings 462. The two platform walls are connected through a pivot pin 466 which extends through the bores in the bearing rings 462 and the bores 464 in the ends of the upper and lower flanges. Furthermore, at the pivot pin 466 there is connected a support arm 422 which encloses the corner of the platform between legs 468 and 470 of a yoke-like end of the support arm 422 near the platform. On the upper leg 470 of the support arm 422 there is arranged a support member 472 in which the pivot pin 466 is anchored by means of a bolt 474 which extends perpendicularly relative to its axis.

In the state illustrated in FIG. 9, the pivot pin 466 is surrounded between the bearing rings 462 by a sleeve which is divided into two half shells 476. Each half shell 476 is fastened to a web 460 of a platform wall 418 and to a bearing ring 462. In FIG. 9, the half shell 476 is fastened to the upper bearing ring 462, and it terminates a distance from the lower bearing ring 462 which facilitates the insertion of the lower flange 458 of the other platform wall 418. The second bearing shell 476 (not shown) forms a complete sleeve with the illustrated bearing shell and is fastened to the lower flange 458 or, more accurately, to the upper bearing ring 462.

FIG. 10 shows in a simplified schematic illustration the connection of two platform walls 618 in accordance with a modification of FIG. 9. In this case, the platform walls 618 are rigidly connected to a bearing sleeve 680 through webs 678 in order to receive a pivot pin by means of which a support arm (not shown) is connected to the platform. Accordingly, in this case, the platform walls 618 are not connected to each other in an articulated manner as in the embodiment shown in FIG. 9. The webs 678 are formed with a shape and dimensions such that their bending resistance is lower than the bending resistance of the platform walls 618 in the section which is completed by the transverse legs. In spite of the rigid connection of the two platform walls 618 to each other, this facilitates a deformation of the platform in the above-described manner.

In FIGS. 3 to 5, the deformation of the platform has been illustrated in a substantially exaggerated manner in order to achieve better clarity. In practice, for example, in a crane portal having a clearance width of about 9 meters, it is expected that unevenness of the ground or a support surface to a height of about 30 cm can be withstood by appropriate deformation of the platform.

The connecting structures between the rig and the platform shown in FIGS. 6, 7 and 8 ensure that no significant warping forces are introduced into the rig. This is important if the rig carries, for example, a ball bearing slewing ring which should not be subjected to any warping.

In all embodiments, the support bearing members, for example, the support bearing members 12 in FIG. 1 or the support bearing members 430 in FIG. 3, are intended as having a potential height capability that they could form a portal through which a vehicle could be driven.

In the embodiments according to FIGS. 3 to 10, the track widths of the support bearing members can be changed more easily than in the embodiment according to FIGS. 1 and 2. Of course, the embodiments according to FIGS. 1 and 2 can also be modified in such a manner that their track widths are adjustable.

While specific embodiments of the invention have been shown and described in detail to illustrate the application of the inventive principles, it will be understood that the invention may be embodied otherwise without departing from such principles.

What is claimed is:

1. A support structure for a mobile construction rig capable of adapting to uneven terrain comprising four support bearing members arranged at least approximately in a quadrilateral formation, said bearing members being arranged with bearing points which lie in a common reference plane when said structure is on flat terrain, said structure being configured to permit movement of said bearing members in a vertical direction relative to said reference plane and to couple said bearing members with each other in such a manner that when a first of said four bearing members is moved vertically relative to said reference plane, a second of said bearing members located diagonally opposite said first bearing member is deflected relative to said reference plane in the same direction and by approximately the same distance as said first bearing member, with the third and fourth bearing members of said four bearing members being both deflected relative to said reference plane in a direction opposite to the direction in which said first and second bearing members are deflected and by approximately the same distance.

2. A support structure according to claim 1 further comprising a four-rod coupling system forming a coupling arrangement between said four support bearing members, said four-rod coupling system comprising four coupling rods each arranged to extend, respectively, essentially parallel to a connecting line extending between each two adjacent support bearing members, said coupling rods being connected at their ends in the manner of universal joints and being supported in an articulated manner about coupling rod swivel axles at the center of their lengths, said axles extending perpendicularly relative to the longitudinal extension of a respective coupling rod and essentially parallel relative to said reference plane, with the corners of said four-rod coupling system containing the universal joints being connected to said support bearing members.

3. A support structure according to claim 2 wherein said support bearing members are guided so as to be vertically movable at said rig.

4. A support structure according to claim 3 wherein said four-rod coupling system is a component part of a guide system for said support bearing members.

5. A support structure according to claim 4 wherein said support bearing members are each arranged at the vertices of a two-rod guide system of diagonally oppositely located support bearing members and wherein each is located in a vertical diagonal plane assigned to said support bearing members and formed by guide rods which are connected to each other in an articulated manner approximately in the vertex of a vertex joint having an axis which is perpendicular to the respective diagonal plane, with one of the guide rods of each of said two-rod guide system being always connected at its end facing away from said vertex to a corresponding corner of said four-rod coupling system, with the other guide rod being pivotally connected with its end facing away from the vertex about a guide rod joint having an axis which is perpendicular to the corresponding diagonal plane, said guide rod joint being arranged at said rig.

6. A support structure according to claim 5 wherein said guide rod joint is arranged in approximately vertical alignment with a corresponding corner of said four-rod coupling system.

7. A support structure according to claims 5 or 6 wherein consecutive two-rod guide systems are connected to each other at least approximately in the vertices by means of support rods which are connected to said two-rod guide system by means of support hinges having a hinge axis which is essentially perpendicular to the vertical connecting plane of the respective support bearing members.

8. A support structure according to claim 1 further comprising cylinder-piston means arranged at each of said four support bearing members and operable to effect vertical adjustment of said support bearing members, said cylinder-piston means comprising two cylinder-piston units located at each of said four support bearing members, said two cylinder-piston units being coupled with respect to movement whereby one cylinder-piston unit of each of said support bearing members is connected to one of the cylinder-piston units of a next adjacent support bearing member through a hydraulic compensating line in order to effect an oppositely oriented adjusting movement of said support bearing member.

9. A support structure according to claim 1 further comprising an essentially horizontal platform assembly having said rig connected thereto, said platform assembly consisting of four essentially rectangular warping platform walls which are connected in pairs along vertical edges thereof, said platform walls in the region of said vertical edges having a bending resistance about an axis defined by said vertical edges which is lower than the bending resistance of said platform walls about axes which extend parallel to said edges in the region outside of said vertical edges, said platform assembly being arranged to prevent a collapse under horizontal forces to be expected during operation in the horizontal platform cross section in the center of the height of the platform walls by a stiffening in the center height region of said platform assembly and by residual stiffness in the region of said edges, whereby inclination of diametrically oppositely located edges toward each other is enabled, said support structure further comprising support arms which are connected to said platform assembly adjacent said edges, said support arms extending horizontally outwardly from the platform and being resistant to bending about horizontal transverse axes and each carrying a support bearing member at a horizontal distance from a respective edge of the platform assembly.

10. A support structure according to claim 9 wherein the bending resistance of said platform walls in the region of said vertical edges is not more than one-half of the bending resistance in the region outside of said edges.

11. A support structure according to claim 10 wherein said bending resistance in the region of said vertical edges is one-tenth the bending resistance in the region outside said edges.

12. A support structure according to claim 9 wherein said platform walls are connected with each other in an articulated manner at said vertical edges.

13. A support structure according to claim 9 wherein said stiffening acts at the intersecting points of the diagonals of said platform walls.

14. A support structure according to claim 13 wherein said stiffening is resiliently connected to said platform walls at the intersecting point of diagonals of said platform walls with axes which extend essentially perpendicular to the plane of the respective wall.

15. A support structure according to claim 9 wherein said stiffening is formed by a portion of said rig which provides the connection of said rig with said platform assembly.

16. A support structure according to claim 9 wherein each of said platform walls is formed by a section girder.

17. A support structure according to claim 16 wherein said section girder is a U-section girder having outer legs which are arranged to extend essentially horizontally.

18. A support structure according to claim 16 wherein said section girder is an I-beam girder having transverse legs arranged to extend essentially horizontally.

19. A support structure according to claim 9 wherein said support arms are each connected to said platform assembly near said vertical edges of said platform walls so as to be pivotable about an essentially vertical swivel axis.

20. A support structure according to claim 18 wherein said swivel axes of the hinges connecting said support arms to said platform assembly coincide with the axes of the hinges connecting said platform walls to each other along said edges of said walls.

21. A support structure according to claim 1 wherein said support structure and said rig are constructed to form a portal.

22. A support structure according to claim 1 wherein said rig comprises a ball bearing slewing ring having a vertical axis of rotation.

23. A support structure according to claim 1 wherein said rig comprises a crane tower.

* * * * *